United States Patent
Janse et al.

(10) Patent No.: US 8,781,818 B2
(45) Date of Patent: Jul. 15, 2014

(54) SPEECH CAPTURING AND SPEECH RENDERING

(75) Inventors: Cornelis Pieter Janse, Eindhoven (NL); Leon C. A. Van Stuivenberg, Eindhoven (NL); Harm Jan Willem Belt, Eindhoven (NL); Bahaa Eddine Sarroukh, Eindhoven (NL); Mahdi Triki, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 224 days.

(21) Appl. No.: 13/141,710

(22) PCT Filed: Dec. 17, 2009

(86) PCT No.: PCT/IB2009/055803
§ 371 (c)(1),
(2), (4) Date: Jun. 23, 2011

(87) PCT Pub. No.: WO2010/073193
PCT Pub. Date: Jul. 1, 2010

(65) Prior Publication Data
US 2011/0264450 A1 Oct. 27, 2011

(30) Foreign Application Priority Data

Dec. 23, 2008 (EP) .................................... 08172683

(51) Int. Cl.
*G10L 19/00* (2013.01)
(52) U.S. Cl.
USPC ........................................ 704/200.1; 704/227
(58) Field of Classification Search
None
See application file for complete search history.

(56) References Cited

U.S. PATENT DOCUMENTS

| | | | | |
|---|---|---|---|---|
| 5,991,385 | A | * 11/1999 | Dunn et al. | 379/202.01 |
| 6,122,611 | A | 9/2000 | Su et al. | |
| 6,327,567 | B1 | * 12/2001 | Willehadson et al. | 704/270 |
| 6,546,099 | B2 | 4/2003 | Janse | |
| 6,782,361 | B1 | 8/2004 | El-Malch et al. | |
| 6,850,265 | B1 | 2/2005 | Strubbe et al. | |
| 6,850,496 | B1 | * 2/2005 | Knappe et al. | 370/260 |
| 6,937,295 | B2 | 8/2005 | Islam et al. | |

(Continued)

FOREIGN PATENT DOCUMENTS

| | | |
|---|---|---|
| EP | 1139337 A1 | 10/2001 |
| EP | 1298906 B1 | 4/2003 |
| WO | 2005050618 A2 | 6/2005 |
| WO | 2005106841 A1 | 11/2005 |

OTHER PUBLICATIONS

Spors et al, "Joint Audio-Video Object Tracking", IEEE Signal Processing Magazine, vol. 18, No. 1, pp. 22-31, Jan. 2001.

*Primary Examiner* — Brian Albertalli (57) ABSTRACT

The invention proposes extracting one or more speech signals (151-154) as well as one or more ambient signals (131) from sound signals captured by microphones, wherein each of the speech signals corresponds to a different speaker. The invention proposes to transmit both the one or more speech signals (151-154) and the one or more ambient signals (131) to a rendering side, as opposed to sending only speech signals. This enables to reproduce the speech and ambient signals in a spatially different way at the rendering side. By reproducing the ambient signals a feeling of "being together" is created. In an embodiment, the invention enables reproducing two or more speech signals spatially from each other and from the ambient signals so that speech intelligibility is increased despite the presence of the ambient signals.

13 Claims, 7 Drawing Sheets

(56) References Cited

U.S. PATENT DOCUMENTS

| | | |
|---|---|---|
| 7,058,185 B1 | 6/2006 | Egelmeers et al. |
| 7,146,012 B1 | 12/2006 | Belt et al. |
| 7,162,045 B1 * | 1/2007 | Fujii ............................ 381/94.2 |
| 7,190,775 B2 * | 3/2007 | Rambo ..................... 379/202.01 |
| 7,206,421 B1 | 4/2007 | Taenzer |
| 7,230,639 B2 * | 6/2007 | Ferren et al. ............... 348/14.08 |
| 7,343,289 B2 * | 3/2008 | Cutler et al. ................. 704/259 |
| 7,391,877 B1 * | 6/2008 | Brungart ...................... 381/310 |
| 7,792,674 B2 * | 9/2010 | Dalton et al. ................ 704/270 |
| 8,135,143 B2 * | 3/2012 | Ishibashi et al. ............... 381/92 |
| 8,139,787 B2 * | 3/2012 | Haykin et al. ................ 381/94.1 |
| 8,175,291 B2 * | 5/2012 | Chan et al. ................... 381/94.7 |
| 8,346,565 B2 * | 1/2013 | Uhle et al. ...................... 704/500 |
| 2003/0129956 A1 | 7/2003 | Virolainen |
| 2003/0161479 A1 | 8/2003 | Yang et al. |
| 2005/0080616 A1 * | 4/2005 | Leung et al. ................ 704/200.1 |
| 2007/0109977 A1 * | 5/2007 | Mittal et al. .................... 370/260 |
| 2007/0253574 A1 | 11/2007 | Soulodre |
| 2008/0144794 A1 | 6/2008 | Gardner |
| 2008/0175394 A1 * | 7/2008 | Goodwin .......................... 381/1 |
| 2010/0248704 A1 * | 9/2010 | Pavel .............................. 455/416 |
| 2010/0250259 A1 * | 9/2010 | Oh et al. ........................ 704/500 |
| 2011/0196682 A1 * | 8/2011 | Sandgren et al. ............. 704/270 |

* cited by examiner

SPEECH CAPTURING AND SPEECH RENDERING

FIELD OF THE INVENTION

The invention relates to a speech capturing method and device e.g. for use in a hands-free audio or audiovisual conferencing terminal. The invention also relates to a speech rendering method and device e.g. for use in a hands-free audio or audiovisual conferencing terminal. Furthermore, the invention relates to a communication system, and a hands-free audio or audiovisual conferencing terminal.

BACKGROUND OF THE INVENTION

In nowadays (hands-free) one-to-one communication systems a transmission of a speech is realized by means of a monophonic transmission channel, among others due to bandwidth limitations. As a result at a reproduction side all sounds come from the same direction (or directions if multiple loudspeakers are used) and hence a human ability to separate sound sources based on binaural hearing cannot be used. As a consequence listening to the speech contaminated with noise and/or competing speakers is difficult and leads to reduced speech intelligibility and listener's fatigue. For this reason with hands-free telephony systems the desired speech signal that is transmitted is as "clean" as possible, i.e. it comprises only the desired direct speech. Stationary noise suppression is a must have in hands-free communication. Microphone array beam-forming with additional processing can be used to further enhance the speech. However, the known systems do not provide face-to-face feeling during the communication, especially not for informal settings where not only the speech (message) is important but also the feeling of being together.

SUMMARY OF THE INVENTION

It is an object of the present invention to provide life-like communication with a feeling of being together. The invention is defined by the independent claims. The dependent claims define advantageous embodiments.

A speech capturing device according to the invention comprises:
- a capturing circuit comprising a plurality of microphones for capturing a plurality of sound signals,
- one or more extracting circuits each for deriving a respective speech signal corresponding to a respective speaker from the plurality of the sound signals,
- a residual extracting circuit for deriving one or more ambient signals from the plurality of sound signals each decreased by the one or more speech signals derived by the one or more extracting circuits, and
- a transmitting circuit for transmitting the one or more speech signals and the one or more ambient signals.

In this way one or more speech signals can be extracted from the sound signals captured by the capturing circuit. The extracting circuit provides the speech signal corresponding to a speaker. This speech signal can be seen as a signal that would be provided by one or more close talk microphones in a front of a desired speaker. The residual extracting circuit derives the ambient signal comprising ambient information (i.e. the information comprised in the sound signals without the desired speakers). When transmitting these speech and ambient signals separately the rendering side is able to reproduce the speech and ambient signals in a spatially different way. By reproducing the ambient signal a feeling of "being together" is created. Furthermore, in an embodiment the invention enables reproducing two or more speech signals spatially different from each other and from the ambient signals so that speech intelligibility is increased and listeners fatigue is decreased despite the presence of the ambient signals.

In an embodiment, the speech capturing device further comprises an audiovisual locator for determining one or more locations of the speakers, wherein each extracting circuit is directed to a location of a respective one of the speakers. The advantage of using the audiovisual locator improves robustness of the extracting circuits. The extracting circuit can then remain to be focused on one and the same speaker, even if he is moving and not talking. In this way once the speaker starts talking (again) the extracting circuit is already focused and also the first words are captured with high quality. Otherwise, the extracting circuit has to refocus during the first words, which results in less quality for the first words.

In a further embodiment, the transmitting circuit is further transmitting spatial information comprising locations of the speakers. Such spatial information about the location of speaker(s) describes the auditory scene at a capturing side. With such spatial information it is possible to recreate at the rendering side the same auditory scene as at the capturing side. This property is especially important for audiovisual conferencing, where the audio must correspond to the video. For example when the visual scene comprises three speakers located at a left, middle, and right position, the position information can then be used at the rendering side to reproduce the speakers (approximately) at these three positions.

In a further embodiment, each extracting circuit comprises a generalized side-lobe canceller for deriving the speech signal. A generalized side-lobe canceller is a beam-forming implementation that is especially suitable for adaptive beam-forming. In such canceller a beam is focused on a desired speaker.

In a further embodiment, each extracting circuit further comprises a post-processor circuit for further noise reduction in the speech signal. The post-processor further removes the noise, so that there is less noise in the speech signal transmitted by the transmission circuit. This has the advantage that desired speakers can be better separated and there is more freedom created to position the desired speakers at the rendering side at any desired location.

In a further embodiment, the residual extracting circuit further comprises a multi-channel adaptive filter for deriving one or more ambient signals from the plurality of sound signals each decreased by the speech signals derived by the one or more extracting circuits. The multi-channel adaptive filter estimates the speech signals contained in the sound signals. These speech signals are subtracted from the sound signals, thus providing the ambient signals.

In a further embodiment, the multi-channel adaptive filter is coupled to receive a sound signal captured by one of the microphones as a reference signal. In this way one ambient signal is created at relatively low complexity.

According to another aspect of the invention a speech rendering device comprises:
- a receiving circuit for receiving one or more speech signals and one or more ambient signals, wherein each speech signal corresponds to a different speaker, and
- a rendering circuit for spatially reproducing the one or more speech signals and the one or more ambient signals in such a manner that the speech signals are perceived to come from different directions than the ambient signals.

By reproducing the ambient signals at the rendering side a feeling of "being together" is created. In an embodiment in which two or more speech signals are reproduced spatially different from each other and from the ambient signals the speech intelligibility is maintained or even increased despite of the presence of the ambient signals.

In an embodiment, the rendering circuit is spatially reproducing two or more of speech signals in such a manner that the speech signals are perceived to come from mutually different directions. By reproducing the speech signals spatially different it is easier for the listeners at the rendering side to distinguish between the different speakers and to concentrate on one of the speakers if they talk simultaneously. This leads to less listener's fatigue and improved speech intelligibility.

In a further embodiment, the receiving circuit is further receiving spatial information about locations of the speakers, and the rendering circuit is spatially reproducing the speech signals in such a manner that the speech signals are perceived to come from locations represented by the spatial information. In this way at the rendering side the same auditory scene can be created as at the capturing side, which is especially important for audiovisual communication systems where sound and video should be aligned.

In a further embodiment, the direction from which the speech signal is perceived is aligned to the location of the speaker in a visualization of the speaker. In this embodiment audio and video objects corresponding to the same speaker are perceived as one audiovisual object, which is natural to perceive for the listener and reduces fatigue, which would occur if the speech comes from other direction then this of the video object.

In a further embodiment, amplitudes of the one or more ambient signals are reduced. In this way the listener can control the rendering in his own environment and adapt it to the other ambient signals occurring in his own environment.

According to another aspect of the invention there is provided a communication system for communicating speech signals, and a hands-free audio or audiovisual conferencing terminal.

These and other aspects, features and advantages of the invention will be apparent from and elucidated with reference to the embodiment(s) described hereinafter.

DETAILED DESCRIPTION OF EMBODIMENTS OF THE PRESENT INVENTION

Figure 1:
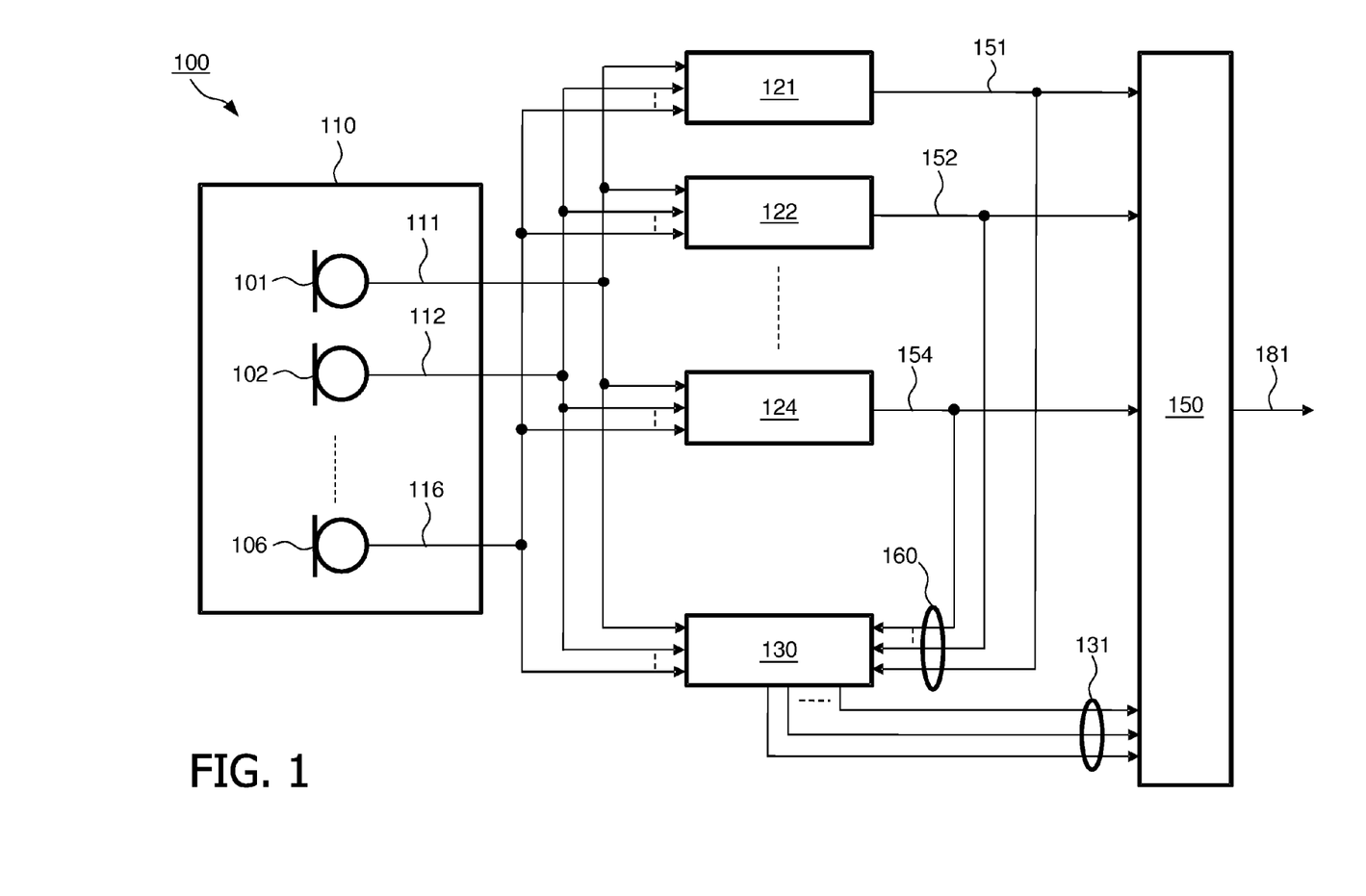
FIG. 1 shows an embodiment of a speech capturing device according to the invention.

FIG. 1 shows an embodiment of a speech capturing device 100 according to the invention. The speech capturing device 100 may be used in hands-free audio or audiovisual conferencing terminal. The hands-free audio or audiovisual conferencing terminal is used to implement a one-to-one communication application, wherein speakers located in two different locations, e.g. rooms, are communicating with each other. The number of speakers at the location can vary from one to multiple speakers. The location of the speakers in the room can also vary.

The device 100 comprises a capturing circuit 110 for capturing a plurality of sound signals 111, 112 till 116. The capturing circuit 110 comprises a plurality of microphones 101, 102 till 106. These microphones are preferably arranged in the form of an array of microphones. Although only six microphones are depicted in this example, the number of the microphones is not restricted to this number.

The speech capturing device 100 further comprises one or more extracting circuits 121, 122 till 124. Each of the extracting circuits corresponds to one of the speakers. In the example, the extracting circuit 121 corresponds to a first speaker, the extracting circuit 122 to the second speaker, etc. Each of the extracting circuits corresponds to a different speaker. Each of the extracting circuits derives the speech signal corresponding to the speaker, which in the example is one of the signals 151, 152, or 154. The signal 151 corresponds, in the example, to the first speaker, the signal 152 corresponds to the second speaker, etc. Each of the speech signals 151 till 154 is derived from the plurality of the sound signals 101, 102 till 106 as captured by the capturing circuit 110. The speech capturing device 100 further comprises a residual extracting circuit 130 for deriving one or more ambient signals 131 from the plurality of sound signals. The ambient signals represent the complement of the speech signals, depicted as the bundle of signals 160, derived from the sound signals. In other words the ambient signal is derived from the sound signals decreased by the speech signals 151, 152, till 154 (the speech signals are subtracted from the sound signal) as derived by the one or more extracting circuits.

The speech capturing device 100 further comprises a transmitting circuit 150 for transmitting one or more speech signals 151, 152, till 154 and one or more ambient signals 131. The transmitting circuit 150 merges the speech signals and ambient signals into a single output signal 181, which is transmitted to the speech rendering device 500. It is clear for the person skilled in art that the merging can be done by e.g. known methods of concatenating or multiplexing.

Figure 2:
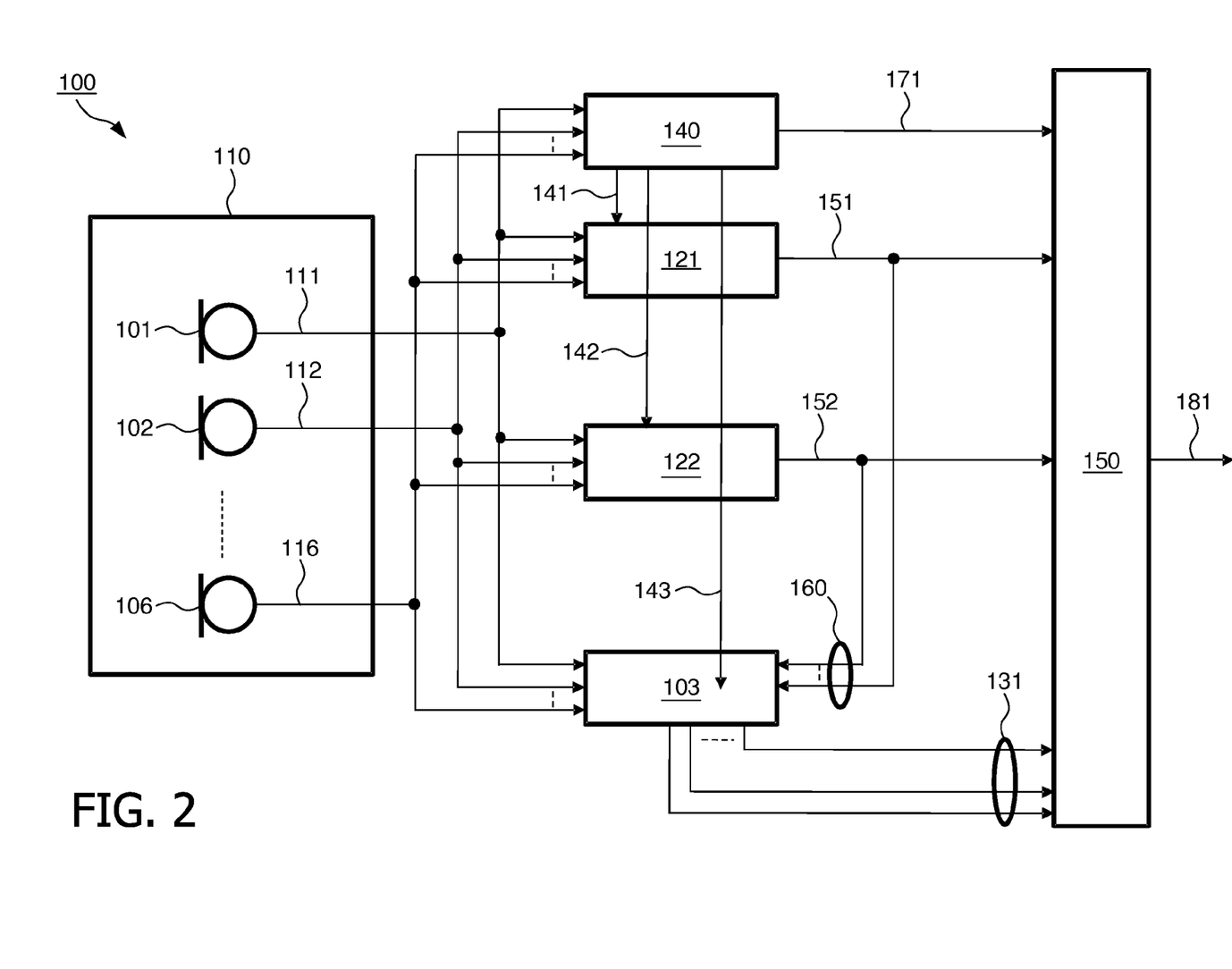
FIG. 2 shows an embodiment of the speech capturing device comprising an audiovisual locator.

FIG. 2 shows an embodiment of the speech capturing device 100 comprising an audiovisual locator 140. The audiovisual locator 140 detects a location of one or more speakers. The information about the location of the speakers is fed to the extracting circuits in order to direct the extracting circuit to the location of the specific speaker. The audiovisual locator can be realized in many ways. Known examples of the audiovisual locators are e.g. U.S. Pat. No. 6,850,265B1, or N. Strobel, S. Spors, and R. Rabenstein, Joint audio-video object localization and tracking, IEEE Signal Processing Magazine, vol. 18, no. 1, pp. 22-31, January 2001. The spatial information might comprise e.g. an angle, as disclosed in U.S. Pat. No. 6,850,265B1, or a position, as described in N. Strobel, S. Spors, and R. Rabenstein, Joint audio-video object localization and tracking, IEEE Signal Processing Magazine, vol. 18, no. 1, pp. 22-31, January 2001.

The speech capturing device 100 depicted in FIG. 2 is the device of FIG. 1 extended by the audiovisual locator 140. In the example, the information about location of the first speaker 141 is fed into the extracting circuit 121, while the information about location of the second speaker 142 is fed into the extracting circuit 122. Although only two extracting circuits are depicted in FIG. 2 as there are only two speakers, more of the extracting circuits can be used wherein the number of the extracting circuits matches the number of the speakers. The transmitting circuit 150 is modified to also transmit the information about the location of the speakers. This allows the speech rendering device 500 to use the information about the location of speakers 141, 142 when rendering the speech signals 151, 152.

In an embodiment, the extracting circuit 121 or 122 comprises a beam-former circuit. One of the examples of the beam-former circuit is a generalized side-lobe canceller as described in WO2005/050618, or WO2005/106841. The generalized side-lobe canceller might comprise e.g. a Filtered Sum Beamformer as disclosed in U.S. Pat. No. 7,146,012, followed by a multi-channel noise canceller as disclosed e.g. U.S. Pat. No. 7,058,185.

Figure 3:
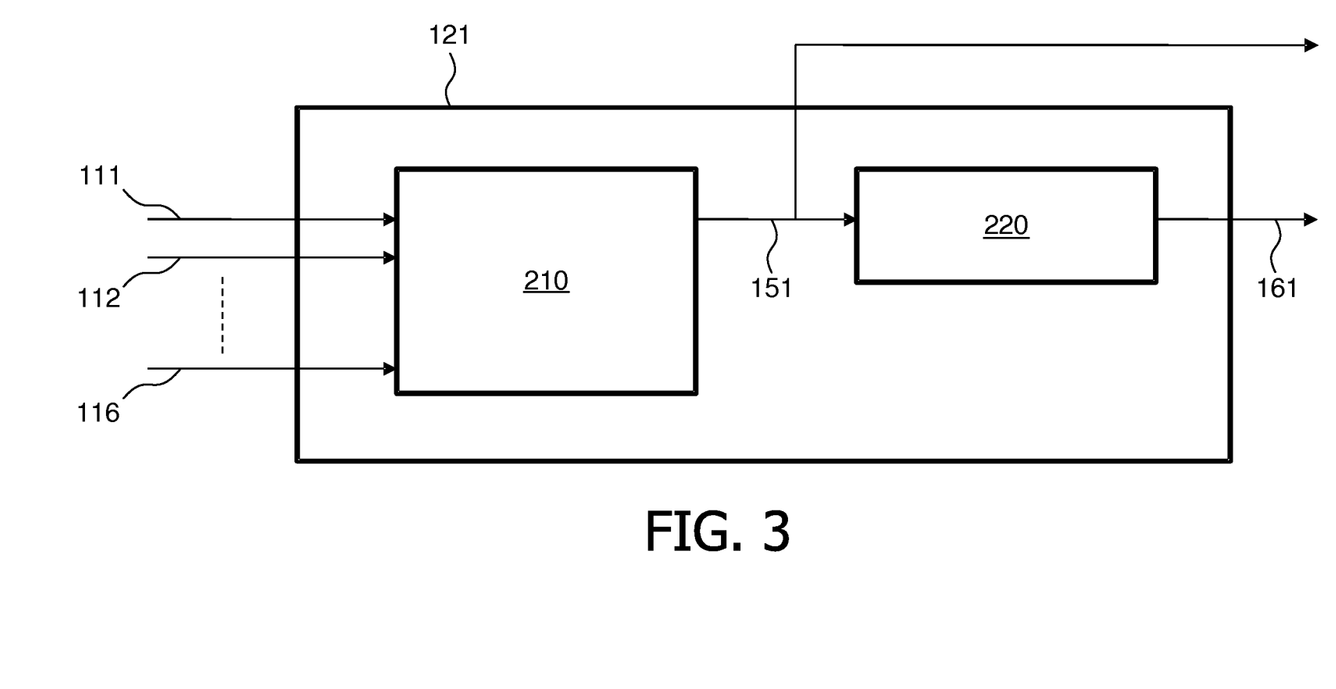
FIG. 3 shows an embodiment of an extracting circuit comprising a post-processor circuit.

FIG. 3 shows an embodiment of an extracting circuit 121 comprising a post-processor circuit 220 as e.g. this described in U.S. Pat. No. 6,546,099. The sound signals 111 till 116 are fed into the generalized side-lobe canceller 210, which provides at its output a speech signal 151. This speech signal 151 is provided as an input to the residual extracting circuit 130. The speech signal 151 is also provided to the post-processor 220, which performs a further noise reduction in the speech signal 151. Hence, the post-processor 220 produces at its output the further speech signal 161 which is cleaner than the speech signal 151. The post-processor circuit 220 provides the further speech signal 161 for transmitting by the transmission circuit 150, which replaces the speech signal 151 as depicted in FIG. 1 and FIG. 2.

Figure 4:
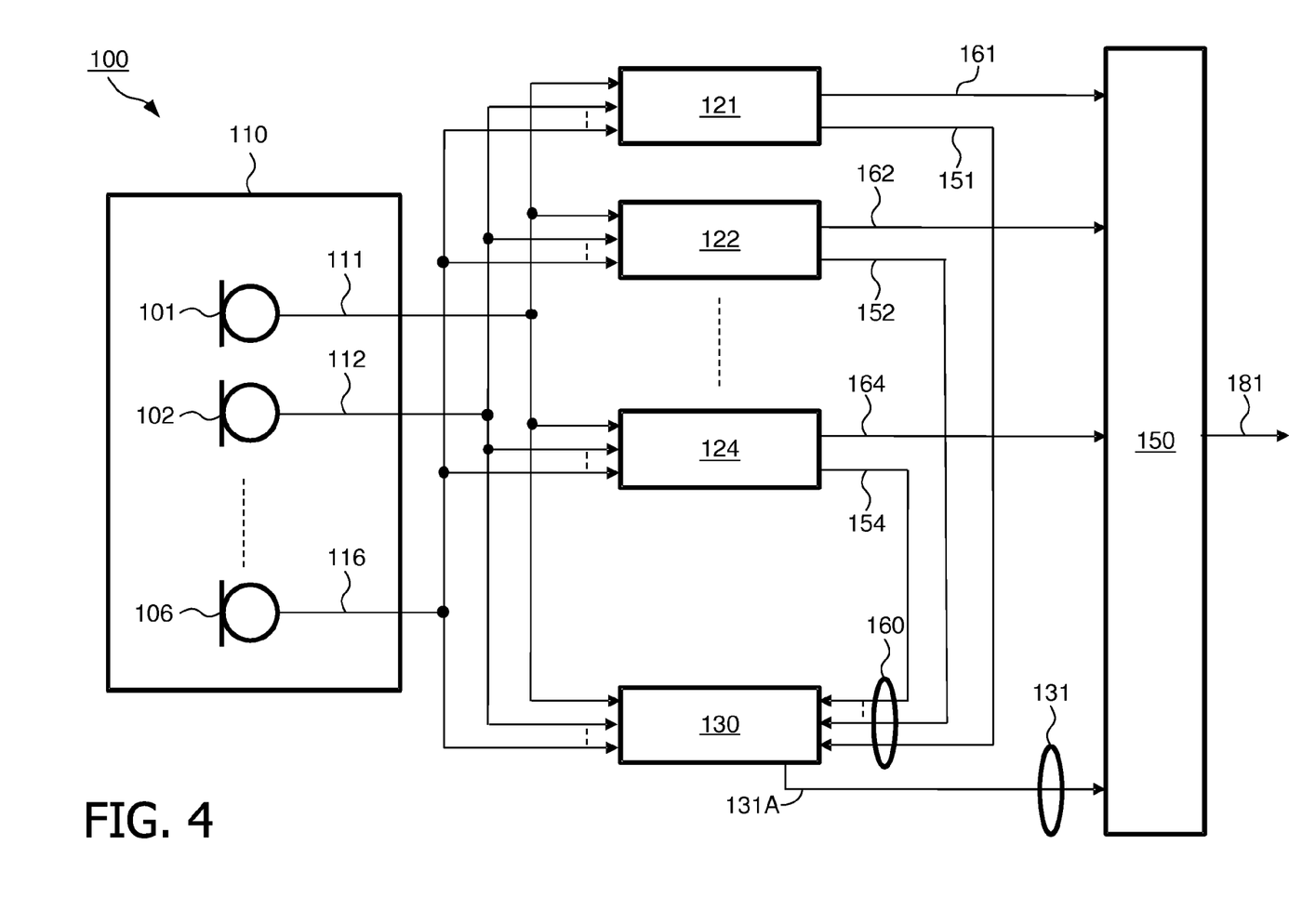
FIG. 4 shows an embodiment of the speech capturing device wherein the extracting circuit comprises the post-processor circuit.

FIG. 4 shows an embodiment of the speech capturing device 100 wherein the extracting circuits 121, 122 till 124 comprise the post-processor circuit 220. Each of the extracting circuits 121 till 124 has two outputs, wherein at the first output the speech signal, e.g. the speech signal 151 for the circuit 121, is provided, and at the second output the further speech signal, e.g. the further speech signal 161 for the circuit 121, is provided. The signals 161, 162 till 164 are now provided to the transmitting circuit instead of the signals 151, 152, till 154.

In comparison with FIG. 1 and FIG. 2 the residual extracting circuit 130 has only one output signal 131A. The residual extracting circuit has two stages. In the first stage for each of the incoming sound signal (one of the signals 11, 112, till 116) the speech signals 151, 152, till 154 are subtracted. As a result a modified sound signal is obtained that does not comprise any of the speech components related to the speech signals extracted by the extracting circuits. There are various options for what signals should be provided to the output of the residual extracting circuit 130. For example, the modified sound signals as they are could be provided to the output of the circuit 130. Another example is that the average signal over all the modified sound signals could be provided to the output of the circuit 130. Another alternative is to select one of the modified sound signals to be provided to the output of the circuit 130. Yet another alternative is explained in FIG. 5.

Figure 5:
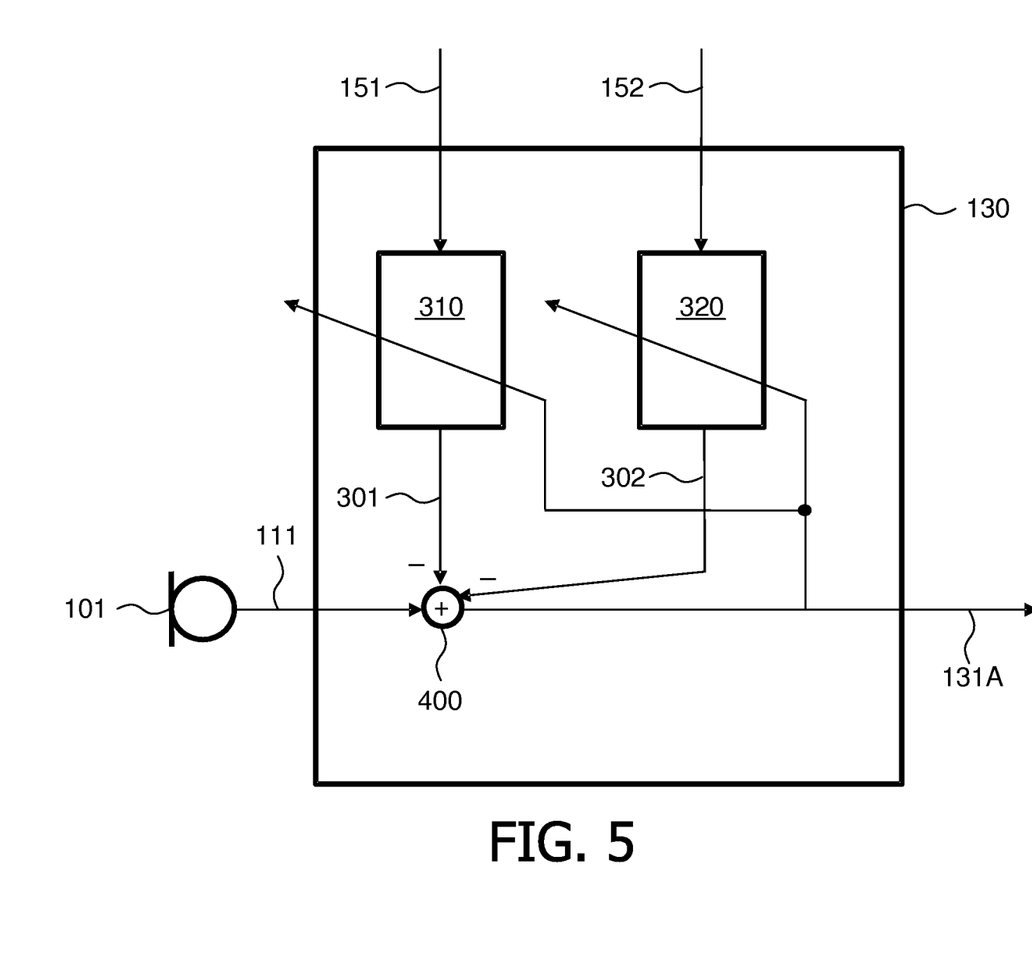
FIG. 5 shows an embodiment of a residual extracting circuit comprising a multi-channel adaptive filter for deriving an ambient signal.

FIG. 5 shows an embodiment of a residual extracting circuit 130 comprising a multi-channel adaptive filter, as described e.g. in U.S. Pat. No. 7,058,185, for deriving an ambient signal 131A. In this specific embodiment the multi-channel adaptive filter is two-channel for simplicity purposes. However, it could also be four-channel, wherein each channel corresponds to one of the extracting circuits 121 till 124.

In the embodiment of FIG. 5 the sound signal 111 captured by the microphone 101 is chosen to be the reference signal. The speech signals 151 and 152 are fed into the two adaptive filters 310 and 320, respectively. The adaptive filters 310 and 320 filter the input signals 151 and 152, respectively, wherein the adaptive filters 310 and 320 are controlled by the residual signal 131A. The residual signal 131A is provided by the subtraction circuit 400 that calculates a difference between the sound signal 111 and the output signals of the adaptive filters 310 and 320. The adaptive filters 310 and 320 adjust their coefficients in such a way that the energy of the residual signal 131A is minimized. For the adaptation of the filter a Normalized Least Mean Square (NLMS) filter, as described in S. Haykin, Adaptive Filter Theory, Englewood Cliffs (N.J., USA): Prentice-Hall, 1986, ISBN 0-13-004052-5 025, can be used. An alternative is to use frequency domain adaptive filters as is described in U.S. Pat. No. 7,058,185. The residual signal 131A is also the output signal of the circuit 130.

Figure 6:
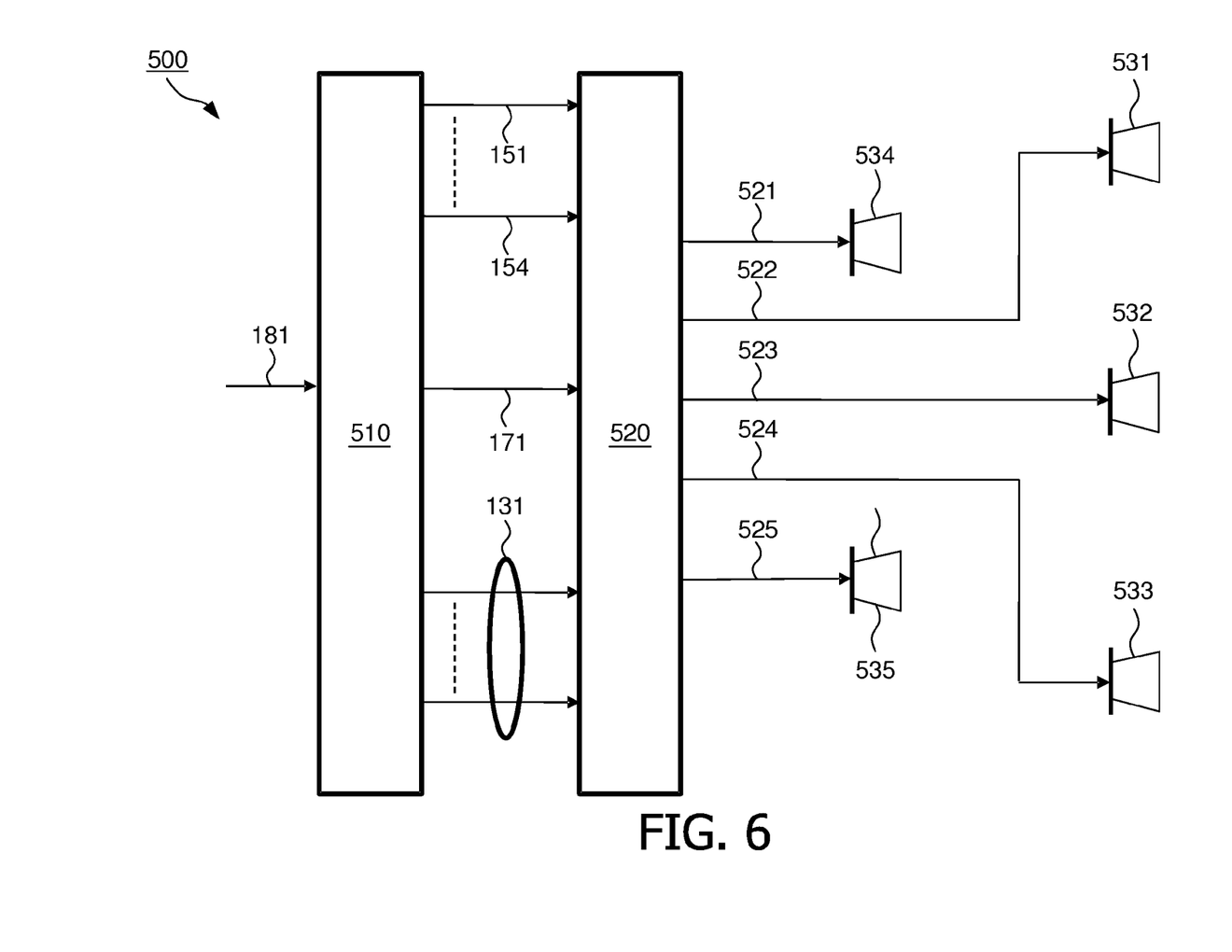
FIG. 6 shows an embodiment of a speech rendering device according to the invention.

FIG. 6 shows an embodiment of a speech rendering device 500 according to the invention. The speech rendering device 500 comprises:
- a receiving circuit 510 for receiving one or more speech signals 151 till 154 and one or more ambient signals (the bundle of signals) 131, wherein each speech signal corresponds to a different speaker, and
- a rendering circuit 520 for spatially reproducing the one or more speech signals 151 till 154 and the one or more ambient signals (the bundle of signals) 131 in such a manner that the one or more speech signals are perceived to come from different directions than the one or more ambient signals.

The receiving circuit 510 extracts the speech signals 151 till 154 and the ambient signals 131 from the input signal 181. The receiving circuit 510 performs functionally the well-known operation of inverting the operation performed in the transmitting circuit 150. The receiving circuit 510 extracts the speech signals and ambient signals from the input signal 181. It is clear for the person skilled in art that the extracting can be done by e.g. known methods of de-concatenating or de-multiplexing.

Optionally when the spatial information 171 about the positions of the speakers is also present in the input signal 181, it is extracted by the receiving circuit 510 and provided to the rendering circuit 520.

The rendering circuit 520 maps the speech signals and ambient signals to the reproducing circuit 530. The reproducing circuit might consist of the loudspeakers. In the example, the reproducing circuit 530 comprises five loudspeakers 531 till 535 in the 5.1 configuration. The loudspeaker 532 reproduces a center channel signal, the loudspeaker 533 reproduces a right front channel signal, the loudspeaker 531 reproduces a left front channel signal, the loudspeaker 535 reproduces a right back channel signal, and the loudspeaker 534 reproduces a left back channel signal. In case only two speakers are present, the speech signal 151 of the first speaker might be reproduced by the loudspeaker 531, while the speech signal 152 of the second speaker might be reproduced by the loudspeaker 532. The ambient signals can then be reproduced by the loudspeakers 535 and 534. In case of multiple speech signals these signals might be reproduced by the front loudspeakers 531, 532, and 533 to give the illusion that the speech signals are perceived to come from different directions. This perception effect might be achieved in many ways such as amplitude panning, time delay panning, and wave-field synthesis techniques.

Alternatively, instead of loudspeakers, headphones could be used. In such a case HRTFs (Chapter 13 "3D Audio and Virtual Acoustical Environment Synthesis" by Jiashu Chen in the book Acoustical Signal Processing For Telecommunication by Steven L. Gay and Jakob Benesty (Editors) Kluwer Academic Publishers: 2000 ISBN 0-7923-7814-8) can be used to reproduce the speech signals and ambient signals in the virtual space.

In a further embodiment, the receiving circuit 510 is further receiving spatial information 171 about locations of the speakers, and the rendering circuit 520 is spatially reproducing the speech signals such that the speech signals 151 till 154 are perceived to come from locations represented by the spatial information 171. This is done using e.g. amplitude panning With amplitude panning it is possible to virtually position the speech signal such that the speaker is perceived to be located in between two loudspeaker positions.

In a further embodiment, the direction from which the speech signal is perceived is aligned to the location of the speaker in a visualization of the speaker.

In a further embodiment, amplitudes of the one or more ambient signals are reduced.

Figure 7:
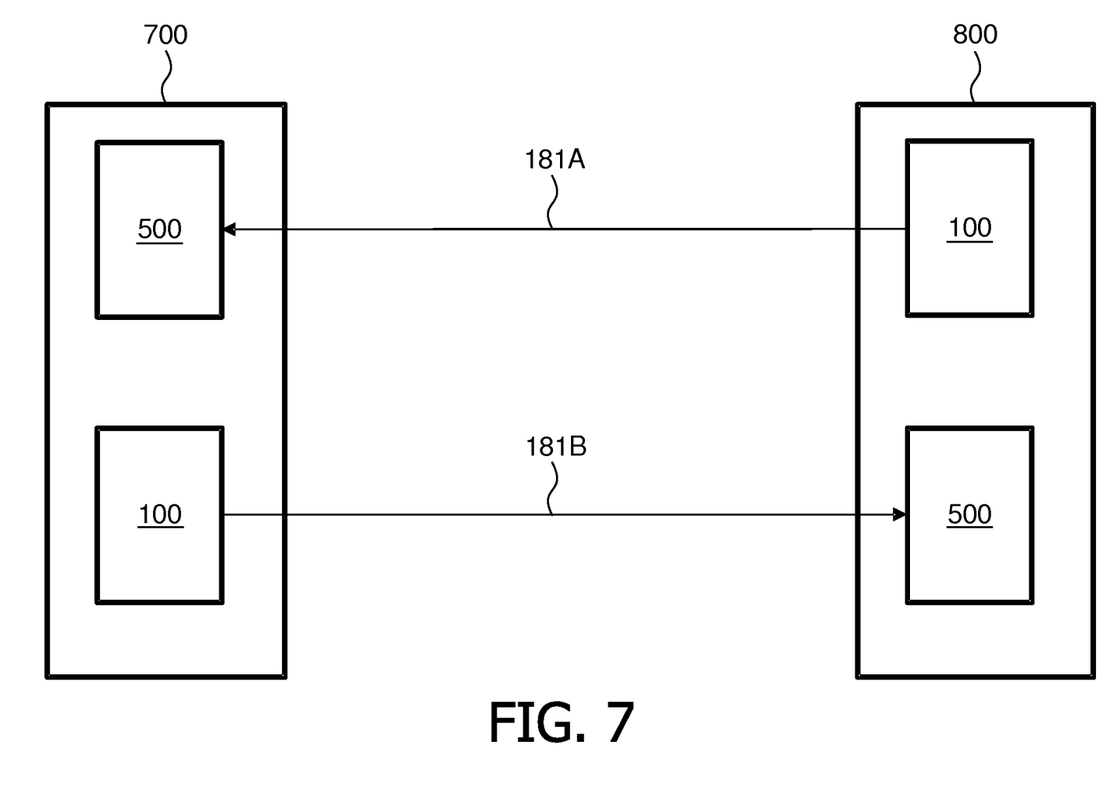
FIG. 7 shows an example of a communication system for communicating speech signals, the communication system comprising the speech capturing device and the speech rendering device according to the invention.

FIG. 7 shows an example of a communication system for communicating speech signals comprising the speech capturing device 100 and the speech rendering device 500 according to the invention.

The communication comprises two terminals 700 and 800. Each of these terminals comprises the speech capturing device 100 and the speech rendering device 500. These terminals have a one-to-one communication application, wherein speakers located in two different locations, e.g. rooms, are communicating with each other. The speech capturing device 100 comprised in the terminal 800 produces an output signal 181A comprising the speech signals and ambient signals that is transmitted to the rendering device 500 comprised in the terminal 700. Respectively, the speech capturing device 100 comprised in the terminal 700 produces an output signal 181B comprising the speech signals and ambient signals that is transmitted to the rendering device 500 comprised in the terminal 800.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term comprising does not exclude the presence of other elements or steps.

Furthermore, although individually listed, a plurality of circuit, elements or method steps may be implemented by e.g. a single unit or processor. Additionally, although individual features may be included in different claims, these may possibly be advantageously combined, and the inclusion in different claims does not imply that a combination of features is not feasible and/or advantageous. Also the inclusion of a feature in one category of claims does not imply a limitation to this category but rather indicates that the feature is equally applicable to other claim categories as appropriate. In addition, singular references do not exclude a plurality. Thus references to "a", "an", "first", "second" etc. do not preclude a plurality. Reference signs in the claims are provided merely as a clarifying example and shall not be construed as limiting the scope of the claims in any way. The invention can be implemented by circuit of hardware comprising several distinct elements, and by circuit of a suitably programmed computer or other programmable device.

The invention claimed is:

1. A speech capturing device-comprising:
a capturing circuit, wherein the capturing circuit includes a plurality of microphones for capturing a plurality of sound signals originating from different spatial locations;
one or more extracting circuits each for deriving a respective speech signal corresponding to a respective speaker from the plurality of the sound signals;
a residual extracting circuit for deriving one or more ambient signals from the plurality of sound signals each decreased by the one or more speech signals derived by the one or more extracting circuits; and
a transmitting circuit for transmitting the one or more speech signals and the one or more ambient signals, further comprising:
an audiovisual locator for (i) determining one or more locations of the speakers and (ii) providing one or more output signals of spatial information about the locations of the speakers to the one or more extracting circuits, respectively, wherein each extracting circuit derives the respective speech signal further in response to a respective output signal of spatial information directed to a location of a respective one of the speakers.

2. The speech capturing device according to claim 1, wherein the transmitting circuit is further arranged for transmitting the output signals of spatial information of the one or more locations of the speakers.

3. The speech capturing device according to claim 1, wherein each extracting circuit comprises a generalized sidelobe canceller for deriving a corresponding speech signal.

4. The speech capturing device according to claim 1, wherein each extracting circuit further comprises a post-processor circuit for performing a further noise reduction in a corresponding speech signal.

5. The speech capturing device according to claim 1, wherein the residual extracting circuit further comprises a multi-channel adaptive filter.

6. The speech capturing device according to claim 5, wherein the multi-channel adaptive filter is coupled to receive a sound signal captured by one of the microphones as a reference signal.

7. A communication system for communicating speech signals, the communication system comprising:
a speech capturing device according to claim 1; and
a speech rendering device, wherein the speech rendering device comprises a receiving circuit for receiving one or more speech signals and one or more ambient signals, wherein each speech signal corresponds to a different speaker, and
a rendering circuit for spatially reproducing the one or more speech signals and the one or more ambient signals, wherein the rendering circuit spatially reproduces the one or more speech signals such that respective directions from which the one or more speech signals are perceived by a listener (a) are aligned to a respective spatial location of a speaker of the different speakers and (b) comprise different directions than perceived directions of the spatially reproduced one or more ambient signals.

8. A hands-free audio or audiovisual conferencing terminal comprising the speech capturing device according to claim 1 and a speech rendering device, wherein the speech rendering device comprises a receiving circuit for receiving one or more speech signals and one or more ambient signals, wherein each speech signal corresponds to a different speaker, and
a rendering circuit for spatially reproducing the one or more speech signals and the one or more ambient signals, wherein the rendering circuit spatially reproduces the one or more speech signals such that respective directions from which the one or more speech signals are perceived by a listener (a) are aligned to a respective spatial location of a speaker of the different speakers and (b) comprise different directions than perceived directions of the spatially reproduced one or more ambient signals.

9. A speech rendering device comprising:
a receiving circuit for receiving one or more speech signals and one or more ambient signals wherein each speech signal corresponds to a different speaker at a different spatial location, the receiving circuit further for receiving spatial information about locations of the different speakers; and a rendering circuit for spatially reproducing (i) the one or more speech signals and (ii) the one or more ambient signals, wherein the rendering circuit, in response to the spatial information, spatially reproduces the one or more speech signals such that respective directions from which the one or more speech signals are perceived by a listener (a) are aligned to a respective different spatial location represented by the spatial information of a speaker of the different speakers in a visualization of that speaker and (b) comprise different directions than perceived directions of the spatially reproduced one or more ambient signals.

10. The speech rendering device according to claim 9, wherein the rendering circuit is arranged for spatially reproducing two or more of speech signals, wherein respective directions of the spatially reproduced two or more speech signals perceived by the listener comprise mutually different directions.

11. The speech rendering device according to claim 9, wherein the rendering circuit is further arranged for reducing amplitudes of the one or more ambient signals.

12. A speech capturing method comprising the steps of:

capturing, via a plurality of microphones, a plurality of sound signals originating from different spatial locations;

deriving, via one or more extracting circuits, one or more speech signals corresponding to one or more respective speakers from the plurality of the sound signals;

deriving, via a residual extracting circuit, one or more ambient signals from the plurality of sound signals each decreased by the one or more speech signals; and transmitting, via a transmitting circuit, the one or more speech signals and the one or more ambient signals, further comprising:

determining, via an audiovisual locator, one or more locations of the speakers and providing, via the audiovisual locator, one or more output signals of spatial information about the locations of the speakers to the one or more extracting circuits, respectively, wherein deriving the respective speech signal further includes deriving in response to a respective output signal of spatial information directed to a location of a respective one of the speakers.

13. A speech rendering method comprising the steps of:

receiving, via a receiving circuit, one or more speech signals and one or more ambient signals, wherein each speech signal corresponds to a different speaker at a different spatial location; and spatially reproducing, via a rendering circuit, the one or more speech signals and the one or more ambient signals, wherein the spatially reproducing spatially reproduces the one or more speech signals such that respective directions from which the one or more speech signals are perceived by a listener (a) are aligned to a respective spatial location of a speaker of the different speakers and (b) comprise different directions than perceived directions of the spatially reproduced one or more ambient signals.

* * * * *